United States Patent
Ondrisek et al.

(10) Patent No.: US 9,814,113 B2
(45) Date of Patent: Nov. 7, 2017

(54) VOLTAGE CONVERTER FOR OPERATING LAMPS

(71) Applicant: TRIDONIC GMBH & CO KG, Dornbirn (AT)

(72) Inventors: Thomas Ondrisek, Vienna (AT); Klaus Mündle, Feldkirch (AT)

(73) Assignee: Tridonic GmbH & Co KG (AT)

( * ) Notice: Subject to any disclaimer, the term of this patent is extended or adjusted under 35 U.S.C. 154(b) by 0 days.

(21) Appl. No.: 15/117,781

(22) PCT Filed: Jan. 14, 2015

(86) PCT No.: PCT/EP2015/050533
§ 371 (c)(1),
(2) Date: Aug. 10, 2016

(87) PCT Pub. No.: WO2015/117797
PCT Pub. Date: Aug. 13, 2015

(65) Prior Publication Data
US 2016/0353541 A1 Dec. 1, 2016

(30) Foreign Application Priority Data
Feb. 10, 2014 (DE) .......................... 10 2014 202 363

(51) Int. Cl.
*H05B 33/08* (2006.01)

(52) U.S. Cl.
CPC ..... *H05B 33/0851* (2013.01); *H05B 33/0812* (2013.01)

(58) Field of Classification Search
CPC ............ H05B 33/0851; H05B 33/0812; H05B 33/0827; H05B 33/0818; H05B 33/0815
See application file for complete search history.

(56) References Cited

U.S. PATENT DOCUMENTS

| 2009/0051301 A1 | 2/2009 | Garufo |
| 2010/0327772 A1* | 12/2010 | Lee .................... H05B 33/0818 315/297 |

(Continued)

FOREIGN PATENT DOCUMENTS

| DE | 10013216 | 9/2001 |
| DE | 102006005521 | 5/2007 |

(Continued)

OTHER PUBLICATIONS

International Search Report dated Jun. 5, 2015 in PCT parent application PCT/EP2015/050533.

(Continued)

*Primary Examiner* — Alexander H Taningco
*Assistant Examiner* — Seokjin Kim
(74) *Attorney, Agent, or Firm* — Andrus Intellectual Property Law, LLP

(57) ABSTRACT

A voltage converter is proposed, for providing a DC voltage ($V_{out}$) for operating at least one LED strip (1), wherein the converter is configured to:
a) output a DC voltage increasing or decreasing at least once, preferably in a voltage range lying above the flux voltage of the LED strip (1) while measuring the LED current ($i_L$), and
b) set the operating point of the DC voltage ($V_{out}$) as a function of this measurement.

16 Claims, 2 Drawing Sheets

(56) References Cited

U.S. PATENT DOCUMENTS

2012/0268013 A1* 10/2012 Riesebosch ........ H05B 33/0827
                                                      315/130
2015/0181666 A1    6/2015 Muesch

FOREIGN PATENT DOCUMENTS

| DE | 102006000810 | 7/2007 |
| DE | 102008010398 | 8/2009 |
| EP | 2315497 | 4/2011 |
| EP | 2579688 | 4/2013 |
| EP | 2683220 | 1/2014 |
| GB | 2434929 | 8/2007 |

OTHER PUBLICATIONS

Search report dated Feb. 11, 2015 for pending Austrian application.

* cited by examiner

VOLTAGE CONVERTER FOR OPERATING LAMPS

CROSS REFERENCE TO RELATED APPLICATION

The present application is the U.S. national stage application of International Application PCT/EP2015/050533, filed Jan. 14, 2015, which international application was published on Aug. 13, 2015 as International Publication WO 2015/117797 A1. The International Application claims priority of German Patent Application 10 2014 202 363.7, filed Feb. 10, 2014.

FIELD OF THE INVENTION

The invention relates to a voltage converter for providing a voltage to operate at least one lamp, in particular one or more LEDs. The invention likewise relates to a system having a voltage converter and a current regulator for regulating the current flowing through the lamp, and to a method of operating a lamp, based on a voltage that is provided.

BACKGROUND

A voltage converter designed as a constant voltage converter provides a DC voltage of, e.g., 12 volts or 24 volts at its output. LED modules can be connected to the output of this converter, which have typically implemented a simple current regulation, e.g. by means of an analog current regulator.

When operating LEDs, the voltage generated by the voltage converter and applied to the LEDs must be sufficiently high. This voltage should be higher than the flux voltage for the LEDs, in order to illuminate the LEDs.

The output voltage of the voltage converter must thus be selected such that, on one hand, the flux voltage of the LED module is obtained, and on the other hand, it should not be too high above the flux voltage of the LED strip, because otherwise unnecessary electrical energy must be dispelled in the current regulator.

An adaptive voltage converter is known from the prior art, DE 10 2006 000 810 D4, wherein the adaptability in this regard is to be understood to mean that when the voltage converter is switched on, it increases its DC output voltage constantly, until a current flow is detected by the LED strip connected thereto. The voltage converter then maintains the output voltage at a steady level, at which it can detect the current flow.

The fact that the setting of the output voltage can only occur when the voltage converter is switched on is a disadvantage in this prior art. It is, in fact, necessary for this adjustment to change the output voltage from a first value lying below the flux voltage to a second value lying above the flux voltage, wherein the output voltage is kept constant after a current flow has been detected. In order to be able to execute a further adjustment while the LED strip is in operation, the LED strip must first thus be switched off, and the output voltage must again be slowly increased from a first value lying below the flux voltage. This would result in a shutting off of the LED strip during the time used for adjusting the output voltage while the LED strip is in operation, which is, of course, not desired.

On the whole, the output voltage can only be adjusted once according to the prior art, such that the power losses in the current regulator are minimized. This power loss, however, can again increase during operation, e.g. because the voltage drop from LEDs—the so-called flux voltage—can fluctuate, in particular as a result of temperature changes.

Given this problem, the object of the present invention is to be able to minimize the power losses and the accompanying heat development, not only when the voltage converter is switched on, but also at a later point in time, when the LED strip is already switched on. An adjustment of the output voltage of the voltage converter should also be enabled, accordingly, during operation of the LED strip.

SUMMARY OF THE INVENTION

The invention assumes that the adaptability of the DC output voltage can be executed not only once, when switching on the converter, but also at a later point in time, while the LED strip is in operation.

According to a first aspect of the invention, a voltage converter is provided for supplying a DC voltage for operating at least one LED strip. The converter is configured to a) output a DC voltage that is increased and decreased in a voltage range lying above the flux voltage or the LED strip, preferably at least once, while measuring the LED current. Furthermore, the converter is designed to b) set the operating point of the DC voltage as a function of this measurement.

In particular as a result of the decrease, the voltage may not drop below the flux voltage.

The converter can be configured to execute steps a) and b) continuously, semi-continuously, or periodically, with at least one repetition.

The converter can be configured to detect the voltage through the LED strip, i.e. the voltage applied to the LED strip, directly or indirectly.

The frequency of the fluctuation of the DC voltage can be selected in a range of 0.05 Hz to 5 Hz.

A PWM modulation can be superimposed on the DC voltage. The converter can also be configured to execute steps a) and b) only when the PWM signal is switched on for this.

According to another aspect of the invention, a system is provided, having a voltage converter of this type and a current regulator supplied by the voltage regulator, or voltage converter, respectively. The current regulator is provided for a constant regulation of the current through the LED strip.

The current regulator and the LED strip can be disposed in an LED module.

According to another aspect of the invention, a method is provided for operating an LED strip based on a DC voltage. The method comprises the step a) for providing a DC voltage for operating an LED strip. It is intended that the DC voltage, preferably in a voltage range lying above the flux voltage for the LED strip, preferably increases and decreases, in accordance with a measurement of the LED current. The method comprises the step b) of adjusting the operating point of the DC voltage, as a function of this measurement.

The steps a) and b) can be executed continuously, semi-continuously, or periodically, with at least one repetition.

The voltage through the LED strip can be detected directly or indirectly.

The DC voltage can be increased and decreased thereby, at a frequency in a range between 0.05 Hz and 5 Hz.

A PWM modulation can be superimposed on the DC voltage. The steps a) and b) are only executed during the time period when the PWM signal is switched on.

The DC voltage can be supplied to a current regulator. This current regulator regulates the current through LED strip on a constant basis.

According to another aspect of the invention, a method is provided for operating an LED strip, based on a DC voltage. The method comprises the step a) of providing a DC voltage for operating an LED strip. The DC voltage preferably changes within a voltage range lying above the flux voltage of the LED strip, while measuring the LED current. Furthermore, a step b) is provided, for determining the gradient of the impedance of the LED strip or an LED module having the LED strip. A step c) is provided, for setting the operating point of the DC voltage ($V_{out}$) as a function of this determination.

The step c) can contain the following steps. The gradient of the impedance is compared with a reference value, c1). The DC voltage is increased, decreased, or maintained, as a function of this comparison, c2).

The steps a), b) and c) can be executed while the LED strip is in operation. Preferably, these steps are repeated numerous times. Preferably, these steps are repeated continuously or periodically.

The adaptability of the DC output voltage can thus be executed while the LED strip is in operation, e.g. periodically or continuously.

For this, an impedance measurement is carried out. This means that the voltage converter determines both the current as well as the voltage in the LED strip. This current and voltage measurement preferably occurs on a sustained basis while the LED strip is in operation.

At this point, either an inherently present modulation of the output voltage occurs, or a targeted modulation of the output voltage occurs, in order to thus spatially determine the course of the impedance curve in the LED strip, in particular the gradients at the operating point. The inherently present modulation is already present when the output voltage of the DC voltage converter already exhibits a ripple. A ripple of this type, or a periodic and random deviation of the output voltage, is obtained in the known manner, e.g., when the voltage converter is supplied by a network voltage.

The converter can thus continuously change its operating point for the DC output voltage, such that the gradient of the impedance can be recognized, such that the output voltage is located in an acceptable range slightly above the flux voltage of the LED strip.

The gradient of the impedance at the operating point is preferably compared with a desired gradient, or with a target gradient, respectively. The target gradient is obtained when the voltage at the LED strip lies slightly above the flux voltage of the LED strip. In this manner, power losses in the current regulator are efficiently minimized. If the determined gradient of the impedance at the operating point is smaller than the target gradient, then the output voltage is reduced. Conversely, when the determined gradient is higher than the target gradient, the output voltage is increased.

Thus, the operating point of the converter may fluctuate when the LED voltage is in operation. This fluctuation may be caused by, e.g. temperature, or ambient temperature, respectively, and serves to minimize the power losses in the current regulator.

The cited voltage modulation, which is necessary at this point for measuring the adaptability, would normally result in visible fluctuations in the light output, but the local current regulation at the LED module is capable of compensating for this effect.

When an artificial modulation of the output voltage occurs, the frequency is relatively low, preferably in the range of 1 Hz, because the human eye discerns brightness fluctuations in this frequency relatively poorly.

The technique according to the invention can be combined with the approach wherein it is determined in a starting phase whether current already flows in the LED strip with an output voltage of 12 V, for example, and if not, the output voltage is increased to, e.g., 24 V. In this specified range of 12 volts DC, or 24 volts DC, the operating point can then be optimized in accordance with the present invention. When the voltage converter is switched on, the output voltage can be continuously increased over an operating range of, e.g., from less than 12 V to more than 24 V. As soon as current flows through the LEDs, the operating point can then be optimized in accordance with the present invention.

For dimming, the DC output voltage of a PWM signal can be low-frequency modulated. The operating point determination by means of appropriate measurements then occurs, as a matter of course, only during the time period in which the PWM signal is switched on.

It may be provided thereby that with low dimmer values, and thus low pulse control factors for the PWM signal, the operating point optimization is selectively switched off in accordance with the present invention.

The invention shall be described below in reference to the Figures.

DETAILED DESCRIPTION

Figure 1:
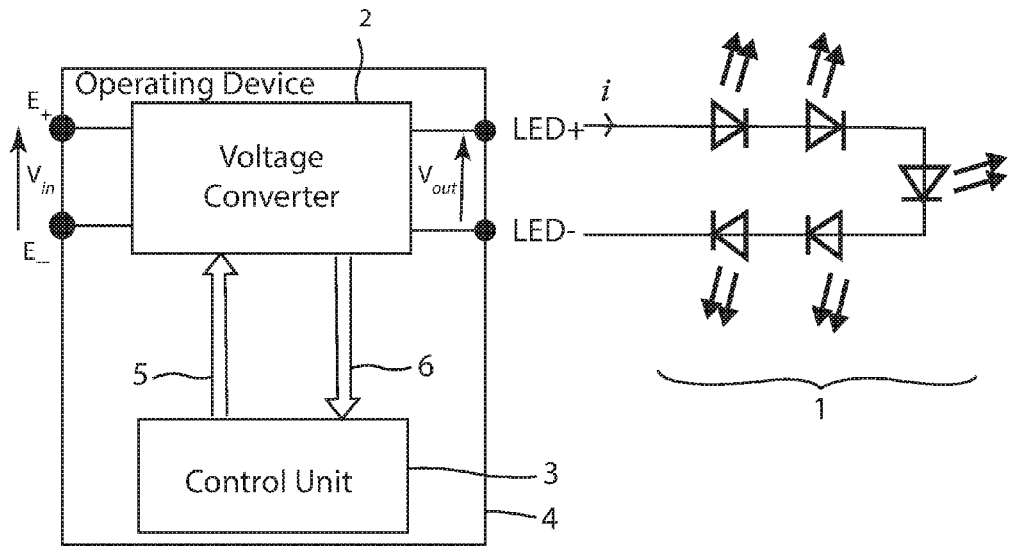
FIG. 1 shows, schematically, the construction of an operating circuit for supplying an LED strip.

An exemplary embodiment of an operating circuit 4 for supplying lamps is shown in FIG. 1, in particular in the form of a converter for supplying LEDs, or for supplying an LED strip, respectively.

The operating circuit 4 is supplied at the input side by an input voltage $V_{in}$ in the form, e.g., of an AC voltage, or supply voltage. The operating circuit 4 comprises two input terminals E+, E− for supplying the input voltage $V_{in}$. The input voltage $V_{in}$ can be supplied, as shown in FIG. 1, to a voltage converter 2 of the operating device 4.

Alternatively, the operating device 4 can have a rectifier and/or a filter (not shown) at the input. The voltage converter 2 is thus supplied with a rectified, and potentially filtered, AC voltage or supply voltage. The supply voltage is preferably sent to a power factor correction circuit (not shown) after the rectifier and/or filter, before it is conveyed further to the voltage converter 2. The input voltage at the voltage converter 2 in this case is a nearly constant bus voltage, potentially having a periodic and random deviation, or a ripple.

Alternatively, the input voltage of the voltage converter 2 can also be a DC voltage, or a constant voltage, such as a battery voltage, for example, wherein the rectifier and the power factor correction circuit are then optional.

The voltage converter, or voltage transformer 2 converts the potentially rectified and filtered input voltage $V_{in}$ to a direct voltage, or a DC voltage. The function of the voltage converter 2 is to generate a constant voltage $V_{out}$ at the output. The amplitude of the output voltage $V_{out}$ can be controlled, or regulated, respectively.

The voltage converter 2 can be designed, e.g., in the form of a step-down converter, or buck converter. By way of example, an input voltage $V_{in}$ in the form of a supply voltage having an amplitude in the range of 120 to 240 V can be converted to a constant output voltage $V_{out}$ of 12 V. As an alternative to the step-down converter, the voltage converter 2 can also be designed as a synchronous converter. These two embodiments are examples of a voltage converter 2 without galvanic separation.

Alternative topologies with galvanic separation can also be used for the voltage converter 2. By way of example, the converter can be designed as a flyback converter, forward converter, or push-pull converter. Embodiments of the voltage converter 2 of this type, either with or without galvanic separation, are known per se.

The output voltage $V_{out}$ of the voltage converter 2 is applied to two output terminals LED+, LED− of the operating device 4. Lamps, e.g. LEDs in the form of an LED strip 1 can be connected at this point to these output terminals LED+, LED−. The LED strip 1 shown in FIG. 1 comprises five LEDs connected in series, which are preferably operated with an output voltage $V_{out}$ of 12 V. The LED strip 1 can have more or fewer LEDs, wherein the amplitude of the output voltage $V_{out}$ is preferably adjusted thereto. The amplitude of the output voltage $V_{out}$ should be higher, in particular, than the flux voltage of the LED strip 1.

A control unit 3 for activating the voltage converter 2 is provided in the operating device 4 in FIG. 1. The control unit 3 can control the voltage converter 2 depending on feedback signals. The feedback signals come from the range, e.g., of the voltage converter 2. Depending on the output voltage $V_{out}$ as a feedback signal, the control unit 3 can activate the voltage converter 2 such that the output voltage $V_{out}$ is regulated to a target value. The feedback of measurement values starting from the voltage converter 2 back to the control unit 3 is indicated in FIG. 1 with the reference symbol 6. The reference symbol 5 indicates a control signal generated by the control unit 3 for activating the voltage converter 2.

Figure 2:
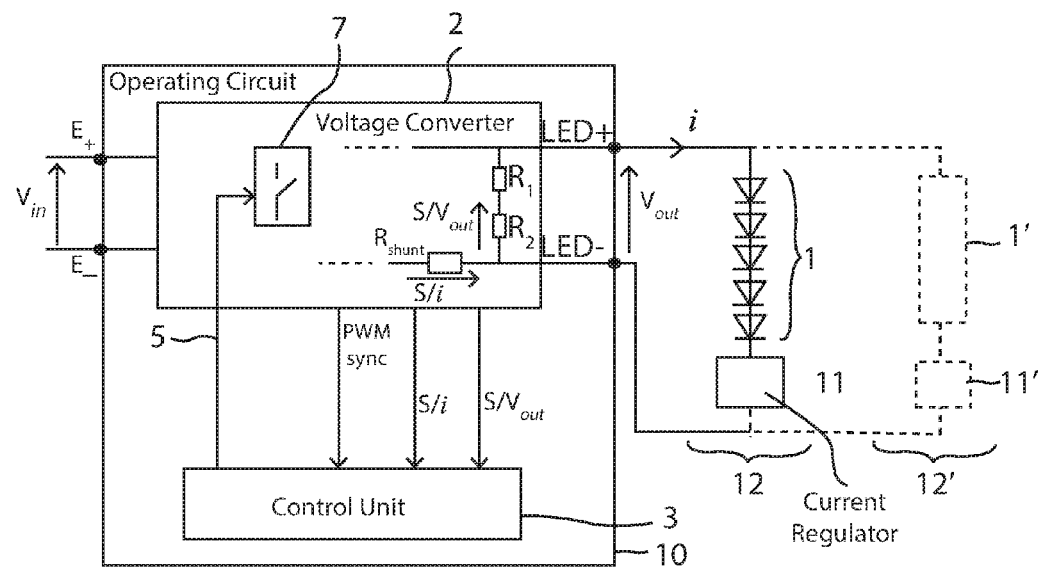
FIG. 2 shows a schematic view of another operating circuit according to the invention.

FIG. 2 shows a schematic view of another operating circuit 10 according to the invention. The construction and the operation of the operating circuit 10 correspond fundamentally to the construction and operation of the operating circuit 4 shown in FIG. 1.

The control signal 5 typically serves to activate at least one switch 7 of the voltage converter 2. By way of example, the voltage converter 2 designed as a step-down converter comprises, in the known manner, a switch 7, wherein, depending on a switching on and off of the switch, the amplitude of the output voltage $V_{out}$ can be adjusted. The voltage converter 2 designed as a flyback converter comprises a switch 7, which is disposed in the known manner on the primary side of a transformer, wherein the output voltage $V_{out}$ is made available at the secondary side of the transformer.

An ohmic voltage divider R1, R2 can be provided parallel to the output terminals LED+, LED−, and thus parallel to the LED strip 1, at which voltage divider a signal $S/V_{out}$ can be accessed, and the conveyed to the control unit 3 as a feedback signal. The measurement signal $S/V_{out}$ is representative of the output voltage $V_{out}$, which is generated for operating the LED strip 1.

The ohmic voltage divider R1, R2 is exemplary for a direct measurement of the output voltage $V_{out}$. The detection of the output voltage $V_{out}$ can alternatively occur indirectly as well. By way of example, with a voltage converter 2 with galvanic separation, having a transformer, it is possible to measure a voltage applied to the primary side of the transformer, and to obtain the output voltage $V_{out}$ at the secondary side of the transformer, taking into account the turns ratio of the transformer. With a flyback converter, the output voltage $V_{out}$ can be determined indirectly via a multiplication of the input voltage of the flyback converter with the turns ratio.

In the operating device 4, furthermore, a measuring resistor, or shunt $R_{shunt}$, respectively, is connected in series to the LED strip. A measurement signal S/i is accessed at the measurement resistor $R_{shunt}$, and conveyed to the control unit 3. This measurement signal S/i represents the current through the LED strip 1. Alternative known means for measuring the output voltage $V_{out}$ and/or the current through the LED strip 1 can also be used here.

The LED strip 1 is connected in turn to the output terminals LED+, LED−. In FIG. 2, a constant current source 11 is provided in addition, connected in series to the LED strip 1. This constant current source 1 serves as a current regulator, in order to maintain the current through the LED strip at a constant level, i.e. to regulate the current to a current target value. The LED strip 1 and the current regulator 11, preferably the linear current regulator 11, are connected in series and are a part of an LED module 12, which is connected to the output terminals LED+, LED−.

Alternatively, the current regulator 11 can also be integrated in the operating circuit 10. In this case, the current regulator can be disposed in series between the voltage converter 2 and the LED strip 1, i.e. in series between the voltage converter 2 and the output terminals LED+, LED−.

The operating circuit is also suitable for operating numerous LED strips, or numerous LED modules, respectively. This is indicated in FIG. 2 with broken lines. An optional further LED module 12' is depicted parallel to the LED module 12, which comprises, in turn, an LED strip 1' connected in series to a current regulator 11'.

Thus, one or more LED modules can be connected to the output of the voltage converter 2, wherein these LED modules typically implement a simple current regulation, e.g. by means of an analog current regulator.

Figure 3:
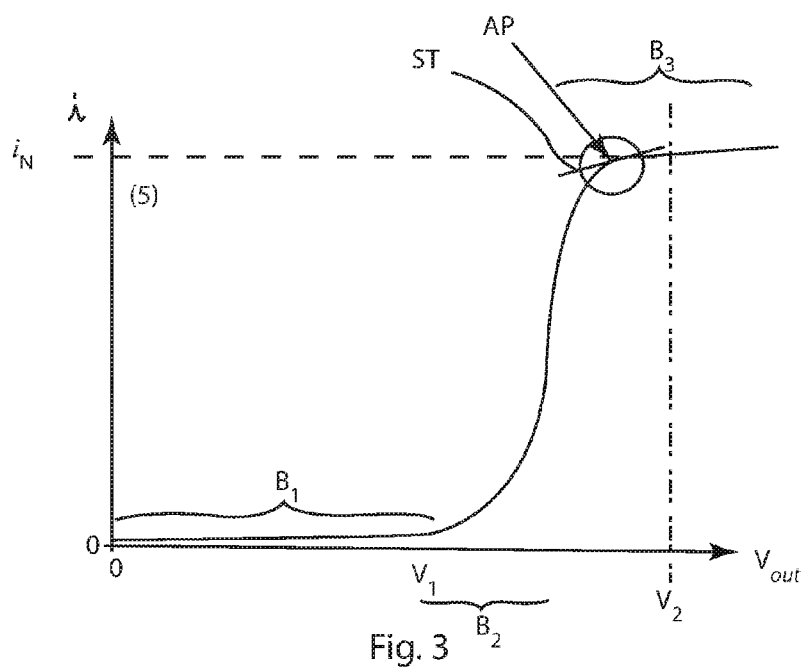
FIG. 3 shows a typical curve for electrical values for the exemplary embodiment shown in FIG. 2.

FIG. 3 shows a typical curve for electrical values of the exemplary embodiment shown in FIG. 2.

In particular, the curve of current i through the LED strip 1 is shown as a function of the output voltage $V_{out}$, i.e. in relation to the voltage decreasing over the LED strip 1, or over the LED module 12, respectively.

The current/voltage curve exhibits an S-shaped curve. With a low output voltage $V_{out}$ between zero and a first value V1, no, or nearly no, current flows through the LEDs. This range, without LED current and thus without illumination of the LEDs, is indicated in FIG. 3 by B1.

Starting at this value V1, the current i increases with the voltage $V_{out}$, preferably exponentially. The reference symbol B2 indicates the range of the nearly exponential current/voltage curve. As soon as the output voltage $V_{out}$ reaches the flux voltage of the LEDs, the LEDs become conductive, and the LEDs light up.

When the output voltage $V_{out}$ is increased further, the LED current i begins to level off again. This corresponds to a range B3 for the output voltage $V_{out}$. This leveling off of the curve can be attributed to the fact that at this point a current regulator 12 is used for regulating the current through the LED strip 1. An operating point AP is thus established for the voltage converter, or the DC output voltage $V_{out}$. A nominal current $i=i_N$ is obtained at this operating point AP.

In order to be able to obtain the nominal current $i_N$, the output voltage should reach a minimum value. This minimum value for the output voltage does not remain constant, but instead, is dependent in turn on the current, the type of LEDs, the number of LEDs, the temperature and on the current regulator.

Known voltage converters intentionally generate an output voltage in this context that is too high. This leads, on one hand, to the nominal current $i_N$ being able to be obtained. On the other hand, unnecessary electrical energy must be dispelled in the current regulator, which also leads to an undesired increase in temperature.

The adaptive voltage converter from the prior art specified in the introduction offers the possibility of adjusting the DC output voltage to an optimal level in this regard when the voltage converter is switched on, such that no, or very little, electrical energy must be dispelled in the current regulator. In the course of operating the LEDs, however, this set DC output voltage may lead to an increase in power losses in the current regulator.

It is thus proposed according to the invention that a DC output voltage $V_{out}$ be provided, which preferably changes in a voltage range above the flux voltage for the LED strip. (In particular in the course of the lowering, the voltage may not fall below the flux voltage.)

The LED current is measured thereby continuously, or in discreet time intervals. The operating point of the DC output voltage $V_{out}$ is then set as a function of this measurement. Thus, the output voltage can be optimized during the operation of the LEDs, in order to minimize the power losses in the current regulator.

The LED strip 1 is preferably operated as follows, starting from the voltage converter 2:

When the voltage converter 2 is activated, the output voltage $V_{out}$ is first set to a maximum value V2. This maximum value V2 is preferably above the flux voltage for the LED strip. This maximum value V2 should also be operationally safe for the voltage converter and for the LED strip.

Subsequently, the gradient for the impedance of the LED strip, or the slope of the current/voltage curve, respectively, is determined from the measurement signals S/i and S/$V_{out}$, which are each representative of the LED current and the output voltage $V_{out}$. This slope is indicated in FIG. 3 by the reference symbol ST. The slope is a measure for the steepness of the current/voltage curve.

The gradient of the impedance, or the slope of the current/voltage curve, respectively, is subsequently compared with a reference value by the control unit 3. This reference value is preferably stored in the control unit 3. This reference value can be used independently of the LED strip. I.e., the control unit 3 always compares the currently determined gradient with the same reference value. Alternatively, the reference value can be adaptive, and dependent on the LED strip.

If the gradient has not reached the reference voltage, the output voltage $V_{out}$ is reduced. Preferably, the output voltage $V_{out}$ is reduced such that no change in the brightness generated by the LED strip can be discerned by the human eye in the transition between the old value and the new value for the output voltage $V_{out}$. Preferably the output voltage $V_{out}$ is changed, or reduced, by a value that is as low as possible. Preferably, the value for the output voltage $V_{out}$ can be changed by 0.2 V.

This operating point optimization is preferably carried out at regular intervals, in order to always have the lowest possible power losses in the current regulator. The output voltage $V_{out}$ is then reduced in steps, as long as the gradient does not reach the reference voltage.

In accordance with the invention, the direction of change for the output voltage $V_{out}$ can depend on the comparison with the reference value. If the determined gradient is lower than the reference value, then the output voltage $V_{out}$ is reduced. Conversely, the output voltage $V_{out}$ is increased if the gradient is to be higher than the reference value. The change in the output voltage $V_{out}$ should not be detectable by the human eye in the form of a brightness fluctuation.

This reduction or increase in the output voltage $V_{out}$ is executed in that it is modified in accordance with the target value for the output voltage $V_{out}$, and in that the control unit 3 then changes its activation of the switch 7 accordingly. The time period between two operating point optimizations, i.e. between two determinations of the gradient, should be long enough that the output voltage $V_{out}$ can also be adjusted to the higher or lower target value.

The first step in setting the output voltage $V_{out}$ to the maximum value V2 is not absolutely necessary. Alternatively, the output voltage can be increased in steps, or continuously, when the converter 2 is switched on, until a current flows through the LED strip. Subsequently, one, or preferably more operating point optimizations can occur, in order to increase or reduce, respectively, the output voltage $V_{out}$ in accordance with the invention.

In order to determine the gradient, or the slope ST, respectively, the output voltage $V_{out}$ is slightly reduced or increased, starting from the value it was set to, in order to be able to determine the course of the impedance curve for the LED strip. This requires a minimal number of current and voltage measurements S/i, S/$V_{out}$. With each measurement, the output voltage $V_{out}$ should be modified by at least a minimum value. Preferably a minimum number of measurement values is established in order to ensure a stable determination of the slope ST. Preferably 16 voltage measurement values and the respective 16 corresponding current measurement values should be determined.

Based on these preferably digitalized measurement values, a regression analysis is executed by the control unit 3, in order to determine an estimated value for the slope ST. The control unit 3 can use various estimating functions thereby. Preferably the slope ST is determined using a Theil-Sen estimating function.

Depending on this determination of the slope ST, or the gradient, respectively, the output voltage $V_{out}$ for the converter 2 is modified, and thus the operating point is optimized in order to reduce the power losses in the current regulator.

Figure 4:
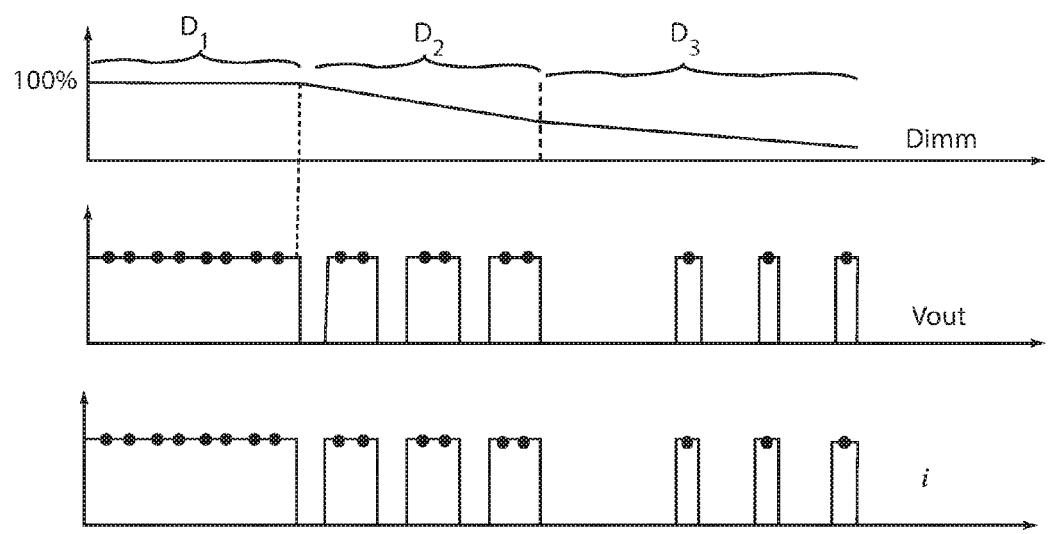
FIG. 4 shows a synchronization between a PWM modulation of the output voltage and a measurement of the LED current and the output voltage in accordance with the invention.

FIG. 4 shows a synchronization between a PWM modulation of the output voltage and a measurement of the LED current and the output voltage in accordance with the invention.

The range D1 shown in FIG. 4 relates to the operation of the LED strip at a dimmer value of 100%. The output voltage $V_{out}$ and the LED current i exhibit constant values. The points are intended to depict the points in time at which the output voltage $V_{out}$ and the LED current i are measured in accordance with the invention, in order to prevent power losses in the current regulator.

For dimming purposes, the DC output voltage $V_{out}$ can be low-frequency modulated by a PWM signal. This is indicated in the ranges D2 and D3. The corresponding PWM module can be provided, for example, inside the converter 2. The determination of the operating point by means of corresponding measurements of the output voltage $V_{out}$ and the LED current i then occurs only during the time period in which the PWM signal is activated; see the points in the active time period in FIG. 4.

Because the PWM modulation occurs in the voltage converter 2 and the determination of the operating point occurs in the control unit 3, a synchronization between the two components is necessary. Accordingly, it is shown in FIG. 2 that the converter 2 supplies a synchronization signal $PWM_{syn}$ to the control unit 3. Using the synchronization signal $PWM_{sync}$, the control unit knows when the activation time periods of the PWM signal occur, and thus when the measurement can be carried out.

With a reduction in the dimmer value, the pulse-width modulation of the PWM signal becomes smaller; see, e.g. the range D3 in comparison with the range D2 having higher dimmer values. With a low dimmer value, lying below the threshold value, or with a low pulse width modulation of the PWM signal lying below a threshold value, the operating point optimization can be selectively deactivated in accordance with the present invention.

The modulation of the DC output voltage $V_{out}$ can be obtained, but need not be, "artificially" by means of a regulator, but it can also be obtained automatically in the form of a ripple at the output of the converter, e.g. through the relatively low capacity of the capacitors at the output, or by means of a sluggish servo loop, which does not fully compensate for a ripple caused by the supply voltage.

The invention claimed is:

1. An operating device for one or more LED strips comprising a voltage converter that outputs a DC output voltage to operate the one or more LED strips and a control unit that controls operation of the voltage converter, wherein the operating device is configured to implement the following steps:
    a) output a DC output voltage ($V_{out}$) from the voltage converter increasing and decreasing at least once in a voltage range lying above a flux voltage of the one or more LED strips (1) to artificially modulate the DC output voltage, while measuring an LED current ($i_L$),
    b) calculate a gradient of the impedance of the one or more LED strips (1) in the control unit by calculating a change in measured LED current ($i_L$) with respect to a respective change in DC voltage (Vout) by a regression method; and
    c) compare the calculated gradient of impedance to a reference value in the control unit, and lower the operating point of the DC voltage ($V_{out}$) if the gradient is less than the reference value and raise the operating point if the gradient is greater than the reference value.

2. The operating device according to claim 1, wherein the voltage converter and control unit are configured to execute the steps a) through c) at regular intervals, where the operating point of the DC output voltage (Vout) is lowered or raised in steps and no more than 0.2V per step.

3. The operating device according to claim 1 wherein the voltage converter further comprises an ohmic voltage divider in parallel with output terminals for the voltage converter and a current measuring resistor in series to the one or more LEDs, wherein a voltage feedback signal representative of the output voltage (Vout) passing through the one or more LED strips is accessed from the ohmic voltage divider and sent to the control unit, and a current feedback signal representative of the current passing through the one or more LED strips is accessed from the measurement resistor and sent to the control unit.

4. The operating device according to claim 1, wherein artificial modulation of the output voltage occurs at a low frequency of the increasing or decreasing DC voltage ($V_{out}$) in a range of 0.05 Hz to 5 Hz so that the human eye does not discerns brightness fluctuations easily.

5. The operating device according to claim 1, wherein a PWM modulation signal is superimposed on the DC output voltage ($V_{out}$) in order to dim the one or more LEDs, the PWM signal having an activated state and an off state, and wherein the voltage converter supplies a PWM synchronization signal to the control unit, and band the values of LED current (iL) and DC output voltage (Vout) used to determine the gradient of impedance are measured only when the PWM signal is activated.

6. A system, comprising the operating device according to claim 1, and further comprising a current regulator supplied by the voltage converter, which constantly regulates the current ($i_L$) through the LED strip (1).

7. The system according to claim 6, wherein the current regulator and the LED strip (1) are disposed in an LED module.

8. A method for operating an LED strip (1) starting from a DC voltage ($V_{out}$), wherein the method includes the following steps:
    a) providing a DC output voltage ($V_{out}$) for operating an LED strip (1) at a voltage level designated as an operating point,
    b) artificially modulating the DC output voltage ($V_{out}$) by increasing and decreasing the output voltage in a voltage range lying above a flux voltage of the LED strip (1) while measuring the LED current, and
    c) calculating a gradient of the impedance of the LED strip (1) by calculating a change in measured LED current ($i_L$) with respect to a respective change in DC voltage (Vout) by a regression method; and
    d) comparing the calculated gradient of impedance to a reference value, and lowering the operating point of the DC output voltage ($V_{out}$) if the gradient is less than the reference value and raising the operating point if the gradient is greater than the reference value.

9. The method according to claim 8, wherein steps b) through d) at regular intervals, where the operating point of the DC output voltage (Vout) is lowered or raised in steps and no more than 0.2V per step.

10. The method according to claim 8, wherein the current passing through the LED strip (1) is detected directly.

11. The method according to claim 8, wherein the artificial modulation of the DC output voltage ($V_{out}$) occurs at a low frequency such that it is increased and decreased within a frequency in a range of 0.05 Hz to 5 Hz so that the human eye does not discerns brightness fluctuations easily.

12. The method according to claim 8, wherein a PWM modulation signal is superimposed on the DC output voltage ($V_{out}$) in order to dim the LED, the PWM signal having an activated state and an off state, and wherein the values of LED current ($i_L$) and DC output voltage (Vout) used to determine the gradient of impedance are measured only when the PWM signal is activated.

13. The method according to claim 8, wherein a current regulator constantly regulates the current through the LED strip (1).

14. The method according to claim 8, wherein the steps of the method the DC output voltage is initially set at maximum voltage (V2) above the flux voltage of the LED strip.

15. The system according to claim 1, wherein the regression method involves in Theil-Sen estimating function.

16. The method according to claim 8, wherein the regression method involves in Theil-Sen estimating function.

\* \* \* \* \*